United States Patent
Moriyama et al.

(10) Patent No.: US 7,399,531 B2
(45) Date of Patent: Jul. 15, 2008

(54) LIQUID ABSORBING SHEET AND NONAQUEOUS ELECTROLYTE BATTERY PACK

(75) Inventors: Hironobu Moriyama, Tochigi (JP); Yasuhiro Fujita, Tochigi (JP); Mamiko Nomura, Tochigi (JP); Kouki Hatsuda, Tochigi (JP)

(73) Assignees: Sony Corporation, Tokyo (JP); Sony Chemical & Information Device Corporation, Tokyo (JP)

( * ) Notice: Subject to any disclaimer, the term of this patent is extended or adjusted under 35 U.S.C. 154(b) by 209 days.

(21) Appl. No.: 10/543,134

(22) PCT Filed: Feb. 17, 2004

(86) PCT No.: PCT/JP2004/001691

§ 371 (c)(1),
(2), (4) Date: Jul. 25, 2005

(87) PCT Pub. No.: WO2004/074334

PCT Pub. Date: Sep. 2, 2004

(65) Prior Publication Data

US 2006/0188724 A1 Aug. 24, 2006

(30) Foreign Application Priority Data

| Feb. 18, 2003 | (JP) | 2003-039776 |
| May 30, 2003 | (JP) | 2003-154195 |
| Aug. 7, 2003 | (JP) | 2003-289270 |

(51) Int. Cl.
*B32B 27/30* (2006.01)
(52) U.S. Cl. .................. 428/522; 429/99; 429/163
(58) Field of Classification Search .............. 428/411, 428/520
See application file for complete search history.

(56) References Cited

U.S. PATENT DOCUMENTS

| 1,718,086 | A | * | 6/1929 | Skinner | 429/65 |
| 2,753,312 | A | * | 7/1956 | Miller | 524/59 |
| 3,781,175 | A | * | 12/1973 | Kinsey | 429/95 |
| 3,846,178 | A | * | 11/1974 | Evjen et al. | 429/82 |
| 4,074,017 | A | * | 2/1978 | Kinsey | 429/1 |
| 4,443,524 | A | * | 4/1984 | Meinhold et al. | 429/99 |
| 4,626,482 | A | * | 12/1986 | Hamlen et al. | 429/27 |
| 4,929,482 | A | * | 5/1990 | Moritani et al. | 428/36.4 |
| 4,992,987 | A | * | 2/1991 | Echols et al. | 365/229 |
| 5,304,434 | A | * | 4/1994 | Stone | 429/99 |
| 5,569,557 | A | * | 10/1996 | Wagner et al. | 429/99 |

(Continued)

FOREIGN PATENT DOCUMENTS

JP   A-8-20640   1/1996

(Continued)

*Primary Examiner*—Holly Rickman
*Assistant Examiner*—Gary Harris
(74) *Attorney, Agent, or Firm*—Oliff & Berridge, PLC (57) ABSTRACT

A liquid absorbing sheet includes a liquid absorbing resin layer that can effectively absorb nonaqueous electrolyte solutions used in nonaqueous electrolyte secondary cells that make nonaqueous electrolyte battery packs (in particular, lithium ion-based nonaqueous secondary battery packs). The liquid absorbing resin layer is obtained by irradiating UV-rays onto a monomer composition to polymerize the monomer composition, the monomer composition containing:
  a monofunctional monomer component containing a monofunctional monomer capable of forming a homopolymer that is soluble in a nonaqueous solvent used in a nonaqueous electrolyte secondary battery; and
  a polyfunctional monomer component.

22 Claims, 3 Drawing Sheets

U.S. PATENT DOCUMENTS

| | | | |
|---|---|---|---|
| 5,663,008 A * | 9/1997 | Shimakawa et al. | 429/43 |
| 5,707,757 A * | 1/1998 | Lee | 429/86 |
| 5,747,965 A * | 5/1998 | LaPointe et al. | 320/112 |
| 5,888,666 A * | 3/1999 | Kawakami | 429/62 |
| 5,910,854 A * | 6/1999 | Varaprasad et al. | 359/273 |
| 6,194,100 B1 * | 2/2001 | Vutetakis et al. | 429/225 |
| 6,216,811 B1 * | 4/2001 | Herc | 180/68.5 |
| 6,300,003 B1 * | 10/2001 | Misra et al. | 429/100 |
| 6,495,282 B1 * | 12/2002 | Yoshida et al. | 429/156 |
| 6,558,847 B1 * | 5/2003 | Kawakami et al. | 429/231.95 |
| 6,667,129 B2 * | 12/2003 | Chikada | 429/99 |
| 6,696,197 B2 * | 2/2004 | Inagaki et al. | 429/120 |
| 7,303,819 B2 * | 12/2007 | Brotzman, Jr. | 428/407 |
| 2002/0015880 A1 * | 2/2002 | Heimer | 429/97 |
| 2003/0087107 A1 * | 5/2003 | Varaprasad et al. | 428/432 |
| 2004/0234865 A1 * | 11/2004 | Sato et al. | 429/322 |
| 2005/0079326 A1 * | 4/2005 | Varaprasad et al. | 428/193 |
| 2005/0118463 A1 * | 6/2005 | Okachi et al. | 429/7 |
| 2006/0172199 A1 * | 8/2006 | Hatsuda et al. | 429/249 |
| 2006/0188724 A1 * | 8/2006 | Moriyama et al. | 428/411.1 |
| 2006/0286442 A1 * | 12/2006 | Flaugher | 429/99 |

FOREIGN PATENT DOCUMENTS

| | | |
|---|---|---|
| JP | A 09-235479 | 9/1997 |
| JP | A 09-259930 | 10/1997 |
| JP | A 11-086855 | 3/1999 |
| JP | A 2001-351588 | 12/2001 |
| JP | A 2003-157851 | 5/2003 |
| JP | A 2003-251178 | 9/2003 |
| WO | WO 03/018687 A2 | 3/2003 |
| WO | WO 03/057745 A1 | 7/2003 |

* cited by examiner

LIQUID ABSORBING SHEET AND NONAQUEOUS ELECTROLYTE BATTERY PACK

TECHNICAL FIELD

The present invention relates to a liquid absorbing sheet for absorbing an electrolyte solution when such a solution leaks from a nonaqueous electrolyte battery cell encased in a nonaqueous electrolyte battery pack. The present invention also relates to a nonaqueous electrolyte battery pack that uses such a liquid absorbing sheet.

BACKGROUND ART

Battery packs are widely used that have a plurality of primary or secondary battery cells, a circuit board, and a battery case encasing these components. When an electrolyte solution leaks from any of the battery cells, it can corrode the wiring of the circuit board, resulting in a conduction failure or short circuit. To prevent such corrosion and short circuits when leakage of the electrolyte solution occurs, a liquid absorbing element containing an absorbent capable of absorbing the electrolyte solution is arranged in the battery pack adjacent to or in the vicinity of the battery cell (Japanese Patent Application Laid-Open No. 2001-351588). Various polymer materials are used as the absorbent, including adsorbents, gelling agents and self-swelling agents. Among specific examples of the absorbents described are polyacrylate-based water-absorbing resins, starch/graft copolymer-based water-absorbing resins, polyvinyl alcohol-based water-absorbing resins, polyacrylamide-based water-absorbing resins, isobutyrene-maleic acid copolymer-based water-absorbing resins, long chain alkyl acrylate crosslinked polymers, and polynorbornens.

One drawback of these absorbents is that they cannot effectively absorb propylene carbonate, dimethyl carbonate and other carbonate-based solvents that are widely used in nonaqueous electrolyte battery packs, a type of batteries that have become increasingly used in recent years. Specifically, these solvents are used in nonaqueous electrolyte secondary cells that make lithium ion-based nonaqueous electrolyte secondary battery packs.

The present invention addresses the above-described problem and to that end, it is an objective of the present invention to provide a liquid absorbing sheet capable of effectively absorbing the nonaqueous electrolyte solution used in nonaqueous electrolyte secondary cells that make nonaqueous electrolyte battery packs (in particular, lithium ion-based nonaqueous secondary battery packs). It is another objective of the present invention to provide a battery pack equipped with an electrolyte-absorbing element made of such a liquid absorbing sheet.

DISCLOSURE OF THE INVENTION

In the course of our study, the present inventors have found that a resin layer obtained in a particular manner can absorb and retain significant amounts of an electrolyte solution, the finding leading to the present invention. Specifically, this resin layer is obtained by irradiating UV-rays onto a particular monomer composition to polymerize the composition and thereby make a sheet. This monomer composition contains the following components: a monofunctional monomer component (A) comprising a monofunctional monomer (a) capable of forming a homopolymer that is soluble in non-aqueous solvents used in nonaqueous electrolyte secondary batteries; and a polyfunctional monomer component (B).

Specifically, the present invention provides a liquid absorbing sheet comprising a liquid-absorbing resin layer, wherein the liquid-absorbing resin layer is obtained by irradiating UV-rays onto a monomer composition to polymerize the monomer composition, the monomer composition containing:

a monofunctional monomer component (A) containing a monofunctional monomer (a) capable of forming a homopolymer that is soluble in a nonaqueous solvent used in a nonaqueous electrolyte secondary battery; and a polyfunctional monomer component (B).

The present invention also provides a nonaqueous electrolyte battery pack having a nonaqueous electrolyte battery cell, a circuit board, an electrolyte-absorbing element for absorbing an electrolyte solution in the event of electrolyte leakage from the nonaqueous electrolyte battery cell, and a battery case encasing all of the above components, wherein the electrolyte-absorbing element is formed of the above-described liquid absorbing sheet.

BEST MODE FOR CARRYING OUT THE INVENTION

First the liquid absorbing sheet of the present invention will be described below in more detail.

Figure 1:
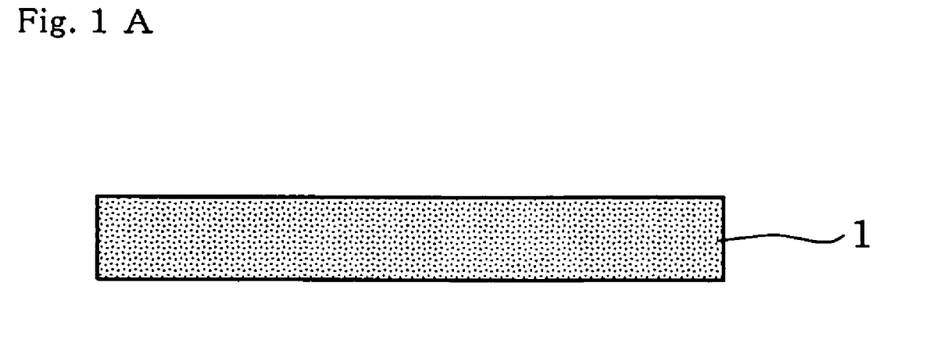
FIGS. 1A, 1B, and 1C are each a cross-sectional view showing a liquid absorbing sheet of the present invention.

The liquid absorbing sheet of the present invention can be provided in different forms. For example, the liquid absorbing sheet may be provided as an independent sheet formed entirely of a liquid absorbing resin layer 1 (FIG. 1A), or it may comprise a substrate 2 with the liquid absorbing resin layer 1 formed on one side (FIG. 1B). Alternatively, the liquid absorbing sheet may include an adhesive layer 3 formed over the liquid absorbing resin layer 1 (FIG. 1C). The liquid absorbing sheet with the configuration shown in FIG. 1C can be easily secured in a battery case. The adhesive layer 3 may be formed of any conventional adhesive. The liquid absorbing sheet of the present invention may not include the substrate: it may be the adhesive layer formed on one side of the liquid absorbing resin layer (the configuration shown in FIG. 1C without the substrate 2).

While the adhesive layer 3 may be formed of any conventional adhesive, it is preferably formed of a liquid absorbing resin layer that itself shows adhesion. Whether a liquid absorbing resin exhibits adhesion or not depends on its composition, as will described later. By using the adhesive layer 3 that serves both as an adhesive and as a liquid absorber, the amount of the liquid that the liquid absorbing sheet can absorb can be increased as compared to a liquid absorbing sheet using a simple adhesive layer that does not absorb a liquid. We will describe this later in the description.

Although the substrate 2 for use in the liquid absorbing sheet of the present invention may be a resin film that is impermeable to electrolyte solutions (such as a plastic film made of polypropylene or other materials), it may be a material that can absorb and retain the nonaqueous solvent, including nonwoven fabric or synthetic paper formed of plastic fibers such as polypropylene, or paper. The substrate made of such a nonwoven fabric can absorb the nonaqueous solvent at an increased rate.

The liquid absorbing resin layer 1 to form the liquid absorbing sheet of the present invention may be a polymer film obtained by irradiating UV-rays onto a particular monomer composition to polymerize the composition and thereby make a sheet. This monomer composition contains the following components: a film-forming, monofunctional monomer component (A) comprising a monofunctional monomer (a) capable of forming a homopolymer that is soluble in nonaqueous solvents used in nonaqueous electrolyte secondary batteries; and a crosslinkable, polyfunctional monomer component (B).

The monofunctional monomer component (A) for use in the present invention must be a monofunctional monomer (a) that can form a homopolymer soluble in nonaqueous solvents used in nonaqueous electrolyte secondary batteries. This is because, if the monofunctional monomer component (A) is composed solely of a monofunctional monomer that forms a homopolymer insoluble in such nonaqueous solvents, the ability of the resulting resin layer to absorb the nonaqueous solvent becomes insufficient. By saying "a homopolymer is soluble in a nonaqueous solvent," it is meant that the weight of the homopolymer is decreased by at least 10% when 1 part by weight of the homopolymer is immersed in 30 parts by weight of a nonaqueous solvent for 24 hours at room temperature (approx. 23° C.). The nonaqueous solvent is especially, a mixed solvent containing at least one of dimethyl carbonate, propylene carbonate, and ethylene carbonate, which will be described later in the description. The mixture preferably contains equal volumes of the respective solvents. The decrease in weight can be determined by comparing the dry weight of the homopolymer measured after the homopolymer has been immersed in the nonaqueous solvent and then pulled out of the solvent, with the weight measured prior to the immersion period. A 100% decrease in weight means that the homopolymer has been completely dissolved in the solvent.

The monofunctional monomer (a) is such that the difference in the solubility parameter value (i.e., SP value $(J/cm^3)^{1/2}$) between the monofunctional monomer and a given nonaqueous solvent used in a nonaqueous electrolyte secondary battery to which to apply the liquid absorbing sheet preferably falls within the range of −1.0 to 8.0 and, more preferably, within the range of 2.0 to 6.5. If this difference falls outside the specified range, the homopolymer becomes substantially insoluble in the nonaqueous solvent, resulting in an insufficient ability of the resulting resin layer to absorb the solvent.

The solubility parameter is determined by the Fedors equation shown below (See, R. F. Fedors, Polym. Eng. Sci., 14(2), p 147, p 472 (1947)). The solubility of the monofunctional monomer in the present invention was determined for polymerized repeating units. In the following Fedors equation, '$\sigma$' indicates the solubility parameter, 'V' indicates the molar volume ($cm^3$/mol) and '$E_{coh}$' indicates the binding energy (J/mol):

$$\sigma = (\Sigma E_{coh}/V)^{1/2}$$

The monofunctional monomer (a) may be a mixture of monofunctional monomers. Given that such a monomer mixture contains n mols of a monomer (a1) with a solubility parameter value of SP1 and m mols of a monomer (a2) with a solubility parameter value of SP2, then the solubility parameter value of the monomer mixture ($SP_{(monomer)mix}$) is determined by the following equation, which is equally applied to determine the solubility parameter for monomer mixtures containing three or more monofunctional monomers:

$$SP_{(monomer)mix} = (SP1 \times n + SP2 \times m)/(n+m).$$

Specific examples of such monofunctional monomers (a) include imide acrylate (SP=27.6), N-vinyl-2-pyrrolidone (SP=26.2), acryloyl morpholine (SP=25), benzyl acrylate (SP=22.9), phenoxyethyl acrylate (SP=22.6), N,N-diethylacrylamide (SP=20.6), methoxypolyethylene glycol acrylate (ethylene oxide-added mol number (n)=9, SP=19.6), methoxypolyethylene glycol acrylate (ethylene oxide-added mol number (n)=3, SP=20.1), tetrahydrofurfuryl acrylate (SP=23), and phenoxypolyethylene glycol acrylate (ethylene oxide-added mol number (n)=6, SP=20.7). Of these, benzyl acrylate, N-vinyl-2-pyrrolidone, tetrahydrofurfuryl acrylate, and acryloyl morpholine are preferred because of the high absorbability of the film for the electrolyte solution. These monomers may be used in combination of two or more. For the purpose of optimizing the balance between the absorbability of the film for the electrolyte solution and the hardness of the film, it is particularly preferred to use benzyl acrylate in conjunction with acryloyl morpholine. In such a case, the ratio of benzyl acrylate to acryloyl morpholine (by weight) is preferably from 30/70 to 70/30. Acryloyl morpholine, when present in excess, improves the absorbability of the film for the electrolyte solution but makes the film hard and susceptible to cracking.

The solubility parameter value of the nonaqueous solvent is preferably in the range of 17 to 28 and, more preferably, in the range of 18 to 23. If the nonaqueous solvent has a solubility parameter value that falls outside the specified range, then the solvent, when used in a lithium battery, can cause a decrease in the cycle performance of the battery.

Among the nonaqueous solvents for use in the present invention are carbonates, including dimethyl carbonate (SP=17.4), propylene carbonate (SP=20.8), and ethylene carbonate (SP=22.5). These carbonates may be used either individually or in combination of two or more. One particularly preferred nonaqueous solvent is a mixed solvent ($SP_{(solvent)mix}$=20.2) containing equal volumes of dimethyl carbonate, propylene carbonate, and ethylene carbonate. Using the solubility parameter and the amount (in the number of mols) of each of the nonaqueous solvents used in the mixture, the solubility parameter of the mixed nonaqueous solvent can be determined in the same manner as in the determination of the solubility parameter of multiple monofunctional monomers used in combination.

The homopolymer of the monofunctional monomer (a) is preferably obtained by adding 0.1 to 5 parts by weight of a UV polymerization initiator (e.g., 2-hydroxy-2-methyl-1-phenyl-propane-1-one, bis-acyl phosphine oxide, benzophenone, and 2-methylthioxanthone) to 100 parts by weight of the monofunctional monomer (a), and irradiating the mixture with UV rays with a wavelength of 250 to 350 nm at an energy density of 100 to 2000 $mJ/cm^2$ to polymerize the monomer.

According to the present invention, the monofunctional monomer component (A) preferably contains the monofunctional monomer (a) in an amount of at least 20 mol %. If too little of the monomer (a) is present, the amount of the nonaqueous solvent that can be absorbed by the liquid absorbing sheet may be reduced.

As long as the advantages of the present invention are not affected, other monofunctional monomers, such as hydroxyethyl acrylate (SP=29.6), acrylic acid (SP=28.7), 2-ethylhexyl acrylate (SP=18.9), and lauryl acrylate (SP=18.7), may be added to the monofunctional monomer component (A).

The polyfunctional monomer component (B) for use in the present invention serves to introduce crosslinks in the liquid absorbing resin layer 1 and is preferably a monomer having two or more acrylate residues. Examples of such monomers are hydroxyl pivalic acid neopentyl glycol diacrylate, polyethylene glycol diacrylate (ethylene oxide-added mol number (n)=14), bisphenol A diacrylate, phenyl glycidyl ether acrylate, and hexamethylene diisocyanate urethane prepolymer.

The amount of the polyfunctional monomer component (B) added to the monomer composition is such that the crosslink density preferably falls in the range of 0.0001 to 0.17 and, more preferably, in the range of 0.001 to 0.1. Too small an amount of the polyfunctional monomer component (B) may make it difficult for the liquid absorbing resin layer 1 to retain its shape, whereas too large an amount of the polyfunctional monomer component (B) may lead to an insufficient ability of the liquid absorbing resin layer 1 to absorb the nonaqueous solvent.

Given that 'a' indicates the number of the functional groups borne by a single molecule of the polyfunctional monomer, 'b' indicates the number of mols of the polyfunctional monomer present in the monomer composition, and 'c' indicates the number of mols of the monofunctional monomer present in the monomer composition, the crosslink density can be defined by the following equation:

$$\text{Crosslink density} = a \times b/(b+c).$$

The first configuration of the liquid absorbing sheet of the present invention as depicted in FIG. 1A can be obtained by coating a peelable film, such as polyethylene terephthalate film, with the above-described monomer composition containing the monofunctional monomer component (A) and the polyfunctional monomer component (B), irradiating the coated film with UV rays to polymerize the composition and thereby form a sheet, and peeling the sheet from the peelable film. The second configuration as depicted in FIG. 1B can be obtained either by coating a nonwoven fabric with the monomer composition and polymerizing the composition, or by laminating a nonwoven fabric onto the first construction of FIG. 1A. The third construction as depicted in FIG. 1C can be obtained by further applying or laminating an adhesive over the liquid absorbing resin layer of the second configuration of FIG. 1B.

By using a peelable sheet embossed with surface patterns, the surface area of the liquid absorbing resin layer can be increased, resulting in an increase in the absorption rate of the liquid absorbing sheet.

Figure 2:
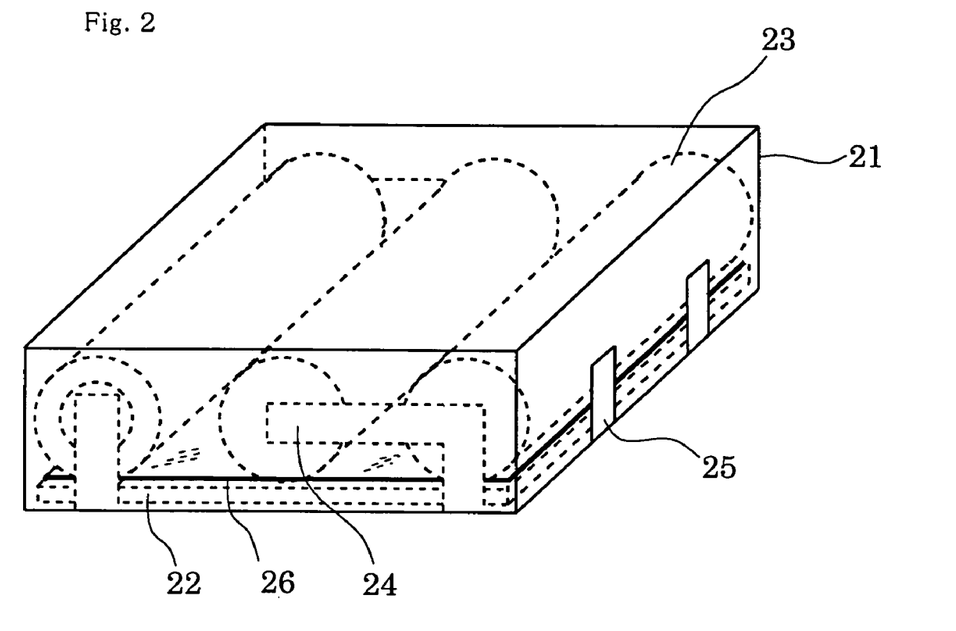
FIG. 2 is a perspective view showing a nonaqueous electrolyte battery pack of the present invention.

The monomer composition containing the monofunctional monomer component (A) and the polyfunctional monomer component (B) may be directly applied to the inner surface of a battery case 21 as shown in FIG. 2, rather than onto the peelable film, such as polyethylene terephthalate film. Then, by irradiating with UV rays, the composition can be polymerized to form a sheet where it has been applied.

The monomer composition can be applied to the peelable sheet or nonwoven fabric by any suitable conventional technique, such as roll coater technique. The UV polymerization is typically carried out at 15 to 25° C. while irradiating UV rays with a wavelength of 250 to 350 nm at an energy density of 100 to 2000 $mJ/cm^2$.

When the liquid absorbing resin layer itself shows adhesion (e.g., when the monofunctional monomer used in the component (A) is tetrahydrofurfuryl acrylate (SP=23), benzyl acrylate (SP=22.9), phenoxyethyl acrylate (SP=22.6), phenoxypolyethylene glycol acrylate (ethylene oxide-added mol number (n)=6, SP=20.7), or methoxypolyethylene glycol acrylate (ethylene oxide-added mol number (n)=3, SP=20.1)), the construction of FIG. 1A or FIG. 1B can be directly attached to the battery pack without providing the adhesive layer. In addition, the liquid absorbing resin layer can be attached to the substrate by using a hand roller at room temperature, rather than by thermal lamination (See, FIG. 1B). Considering the fact that the leakage in many cases occurs at the cathode of the cylindrical batteries, the liquid absorbing sheet is preferably shaped as a doughnut-like shape in its plan view so that it can be applied about the cathode terminal.

According to the present invention, a flame retardant (e.g., phosphate-based liquid flame retardant, aluminum hydroxide, and melamine cyanurate) may be further added to the liquid absorbing resin layer 1 in the liquid absorbing sheet of the present invention. This imparts a flame retardancy to the liquid absorbing sheet. Specifically, when a phosphate-based liquid flame retardant is used as the flame retardant of the present invention, it can impart to the liquid absorbing resin layer 1 a flame retardancy of grade V-0, V-1, or V-2 according to the UL-94 standard. Furthermore, the phosphate-based flame retardant can impart a high adhesion to the liquid absorbing resin layer 1 since the agent remains a liquid under atmospheric pressure, typically at −13° C. to 250° C., and preferably at room temperature. The liquid absorbing resin layer 1 that shows adhesion can be directly attached to the nonaqueous electrolyte secondary battery pack and, thus, can eliminate the need to provide an additional adhesive layer, so that the thickness of the liquid absorbing resin layer 1 does not have to be reduced by an amount corresponding to the thickness of the adhesive layer. Accordingly, the amount of the nonaqueous solvent that can be absorbed by the liquid absorbing sheet can be maintained. Moreover, we have unexpectedly found that when the phosphate-based liquid flame retardant is used as the flame retardant of the present invention, the insulation resistance of the liquid absorbing resin layer 1 can be preferably maintained above $1 \times 10^{12} \Omega$ even after the liquid absorbing sheet has been subjected to a wet heat aging process (e.g., place the liquid absorbing sheet at a temperature of 40° C. under a humidity of 90% RH for 96 hours).

Preferred examples of the phosphate-based liquid flame retardant for use in the present invention include bisphenol A bis(diphenyl)phosphate, hydroquinol bis(diphenyl)phosphate, phenyl dixylenyl phosphate, tricresyl phosphate, cresyl diphenyl phosphate, trixylenyl phosphate, xylenyl diphenyl phosphate, resorcinol bis(diphenyl)phosphate, and 2-ethylhexyl diphenyl phosphate. Of these, bisphenol A bis(diphenyl)phosphate, hydroquinol bis(diphenyl)phosphate and phenyl dixylenyl phosphate are preferred since they can impart high adhesion to the liquid absorbing resin layer 1.

The amount of the phosphate-based liquid flame retardant is preferably in the range of 70 to 200 parts by weight and, more preferably, in the range of 100 to 150 parts by weight with respect to 100 parts by weight of the monofunctional monomer component (A) and the polyfunctional monomer component (B) combined. If too little or too much of the flame retardant is added, desired flame retardancy cannot be achieved.

Figure 3:
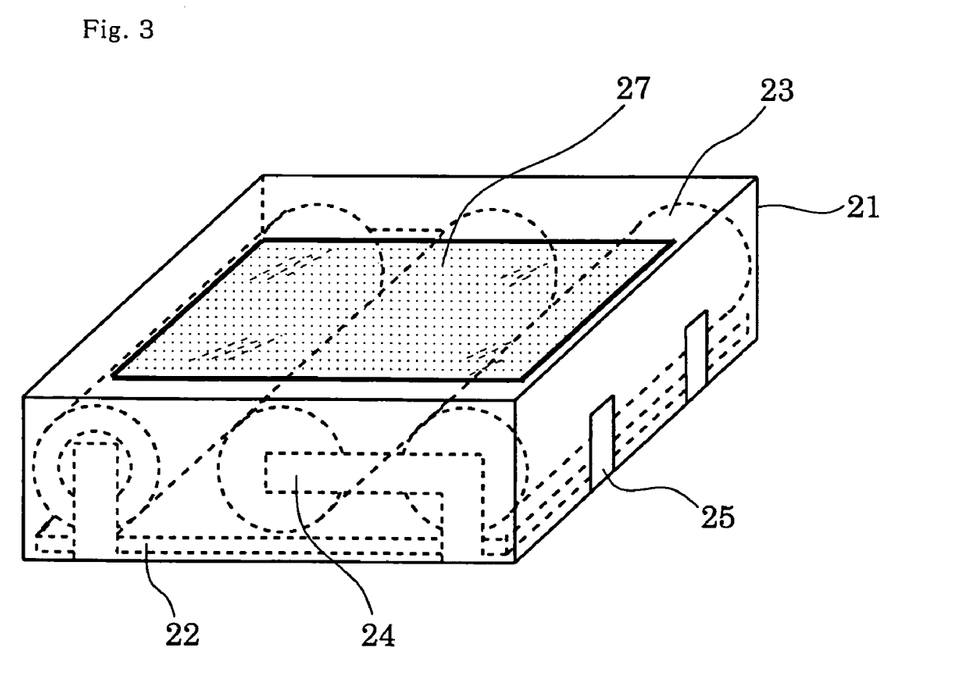
FIG. 3 is a perspective view showing another nonaqueous electrolyte battery pack of the present invention.

The liquid absorbing sheet of the present invention is suitable as an electrolyte-absorbing element used in an nonaqueous electrolyte battery pack that consists of a battery case encasing nonaqueous electrolyte battery cells, a circuit board, and the electrolyte-absorbing element. The liquid absorbing sheet serves to absorb the electrolyte solution should leakage occur from the battery cell. One example of such a battery pack is shown in FIG. 2. The battery pack includes a battery case 21, which encases a circuit board 22 and a plurality of nonaqueous electrolyte battery cells 23 arranged on the circuit board 22. A liquid absorbing sheet 26 as described above with reference to FIG. 1A is arranged between the circuit board 22 and the nonaqueous electrolyte battery cells 23 for absorbing the electrolyte solution should leakage occur from any of the nonaqueous electrolyte battery cells. A metal lead 24 connects the circuit board 22 with each of the nonaqueous electrolyte battery cells 23. The metal lead 24 is also connected to external terminals 25. As shown in FIG. 3, a liquid absorbing sheet 27 as described above with reference to FIG. 1C may be arranged on top of the nonaqueous electrolyte battery cells 23 with its substrate facing the nonaqueous electrolyte battery cells 23.

Although the battery cases of the respective nonaqueous electrolyte battery packs shown in FIGS. 2 and 3 are rectangular parallelepiped with cylindrical battery cells, the shape and arrangement of the battery case and the battery cells, as well as the type of the battery cells, are not limited to those shown in the figures and may vary depending on the intended purposes of the batteries.

As set forth, the nonaqueous electrolyte battery packs of the present invention include the liquid absorbing sheet, which serves as an element for absorbing electrolyte solution should leakage of the solution occur from the battery cells. The liquid absorbing sheet achieves this function by having a liquid absorbing resin layer that can effectively absorb and retain the nonaqueous electrolyte solution. This liquid absorbing resin layer is formed of a monomer composition that contains a monofunctional monomer component (A), which comprises a monofunctional monomer (a) capable of forming a homopolymer soluble in nonaqueous solvents used in nonaqueous electrolyte secondary batteries, and a polyfunctional monomer component (B). The liquid absorbing sheet, when used in nonaqueous electrolyte battery packs, significantly reduces the occurrence of corrosion and short circuits of the circuit board in the event of leakage of the nonaqueous electrolyte solution.

EXAMPLES

The present invention will now be described in detail with reference to examples.

Reference Example

Homopolymers formed of different monofunctional monomers were examined for their solubility in a nonaqueous solvent used in nonaqueous electrolyte secondary batteries.

Specifically, 1 part by weight of a photopolymerization initiator (2-hydroxy-2-methyl-1-phenylpropane-1-one (D1173, Ciba Specialty Chemicals)) was added to 100 parts by weight of a monofunctional monomer. Using a roll coater, the mixture was applied to a polyethylene terephthalate film and was irradiated with a UV-ray with a wavelength of 365 nm. The UV-ray was shone at an energy density of 2000 mJ/cm$^2$. This caused the composition to polymerize and thereby form a polymer film. 1 part by weight of the resulting film was immersed in 300 parts by weight of a mixture containing equal volumes of dimethylcarbonate, propylene carbonate, and ethylene carbonate (SP$_{(solvent)mix}$=20.2) at 23° C. for 24 hours. Subsequently, the mixture was filtrated and the solid product remaining on the filter was dried at 100° C. for 1 hour. The solubility (wt %) of the dried product was determined by the equation below with the results shown in Table 1. In the following equation, $W_1$ indicates the weight of the film prior to the immersion period and $W_2$ indicates the weight of the dried solid product:

$$\text{Solubility} = ((W_1 - W_2)/W_1) \times 100.$$

TABLE 1

| Monofunctional monomer | SP value | ΔSP | Solubility (wt %) |
|---|---|---|---|
| Hydroxyethyl acrylate | 29.6 | 9.4 | 3 |
| Acrylic acid | 28.7 | 8.5 | 5 |
| Imide acrylate | 27.6 | 7.4 | 100 |
| N-vinyl-2-pyrrolidone | 26.2 | 6.0 | 100 |
| Acryloyl morpholine | 25 | 4.8 | 100 |
| Benzyl acrylate | 22.9 | 2.7 | 100 |
| Phenoxyethyl acrylate | 22.6 | 2.4 | 85 |
| N,N-diethylacrylamide | 20.6 | 0.4 | 100 |
| Methoxypolyethylene glycol acrylate (n = 9) | 19.6 | −0.6 | 100 |
| Methoxypolyethylene glycol acrylate (n = 3) | 20.1 | −0.1 | 100 |
| Phenoxypolyethylene glycol acrylate (n = 6) | 20.7 | 0.5 | 100 |
| Tetrahydrofurfuryl acrylate | 23.0 | 2.8 | 100 |
| 2-ethylhexyl acrylate | 18.9 | 1.3 | 3 |

Examples 1 Through 6 and Comparative Examples 1 Through 3

One of the different monofunctional monomers shown in Tables 2 and 3, hydroxyl pivalic acid neopentyl glycol diacrylate to serve as a polyfunctional monomer and 2-hydroxy-2-methyl-1-phenylpropane-1-one to serve as a polymerization initiator were mixed together in the proportions shown in Tables 2 and 3. Using a roll coater, the mixture was applied to a polyethylene terephthalate film and was irradiated with a UV-ray with a wavelength of 365 nm. The UV-ray was shone at an energy density of 2000 mJ/cm$^2$ to cause the composition to polymerize and thereby form a polymer film. The polymer film was peeled off from the polyethylene terephthalate film to give a single-layered liquid absorbing sheet.

The resulting liquid absorbing sheet was immersed in a large volume of a mixed solvent containing equal volumes of dimethylcarbonate, propylene carbonate, and ethylene carbonate (SP$_{(solvent)mix}$=20.2) at 23° C. After 2 hours, the appearance of the liquid absorbing resin layer was visually examined. The liquid absorbing sheet was pulled out of the mixed solvent and the solvent remaining on the surface was immediately wiped off. The sheet was weighed and its swell ratio was determined. The results are shown in Table 2. Each liquid absorbing sheet was also examined for the SP value of the monofunctional monomer (SP$_{(monomer)}$), the difference in the SP value between the monofunctional monomer and the solvent (ΔSP value), the density of crosslinks in the liquid absorbing resin layer of the liquid absorbing sheet and the state after the immersion period. The results are also shown in Tables 2 and 3.

TABLE 2

| Components | Examples (wt parts) | | | | | |
|---|---|---|---|---|---|---|
| | 1 | 2 | 3 | 4 | 5 | 6 |
| Benzyl acrylate | 100 | 100 | 100 | — | 30 | 100 |
| N-vinyl-2-pyrrolidone | — | — | — | 100 | — | — |
| Acrylic acid | — | — | — | — | 70 | — |
| Polyfunctional monomer | 1 | 0.1 | 10 | 1 | 1 | 20 |
| Photopolymerization initiator | 1 | 1 | 1 | 1 | 1 | 1 |
| $SP_{(monomer)}$ | 22.9 | 22.9 | 22.9 | 26.2 | 27.8 | 22.9 |
| $\Delta SP$ | 2.7 | 2.7 | 2.7 | 6.0 | 7.6 | 2.7 |
| Crosslink density | 0.010 | 0.001 | 0.091 | 0.007 | 0.005 | 0.167 |
| Swell ratio (times) | 10 | 10 | 3 | 10 | 3 | 1.6 |
| State after immersion | Film | Gel | Film | Film | Film | Film |

TABLE 3

| | Comparative Example (wt parts) | | |
|---|---|---|---|
| | 1 | 2 | 3 |
| Benzyl acrylate | 100 | — | — |
| Acrylic acid | — | 100 | — |
| 2-ethylhexyl acrylate | — | — | 100 |
| Polyfunctional monomer | — | 1 | 1 |
| Photopolymerization initiator | 1 | 1 | 1 |
| $SP_{(monomer)}$ | 22.9 | 28.7 | 18.9 |
| $\Delta SP$ | 2.7 | 8.5 | −1.3 |
| Crosslink density | 0.000 | 0.005 | 0.005 |
| Swell ratio (times) | Dissolved | 1.1 | 1.1 |
| State after immersion | Liquid | Film | Film |

As shown by the results of Tables 2 and 3, the liquid absorbing sheet of Example 1 swelled 10 times and still retained its film-like shape after it had swollen by absorbing the nonaqueous solvent. This implies that this liquid absorbing sheet can serve as an effective liquid absorbing element for absorbing the electrolyte solution should leakage of the solution occur from the nonaqueous electrolyte battery cells.

The results also indicate that the liquid absorbing sheets of Examples 2 through 6 each exhibits a good performance that allows the practical use of the liquid absorbing sheet as an element for absorbing the electrolyte solution. Nonetheless, the results of Example 2 indicate that the liquid absorbing sheet with a decreased crosslink density tends to become a gel-like material, rather than retaining its film-shape, after absorbing the nonaqueous solvent and swelling. In contrast, the results of Examples 3 and 6 show that an increased crosslink density tends to result in a decreased swell ratio. The results of Example 4 indicate that a good result can be achieved by using, rather than benzyl acrylate, N-vinyl-2-pyrrolidone as the monofunctional monomer. The results of Example 5 indicate that when a monofunctional monomer whose homopolymer is insoluble in the nonaqueous solvent is used together, the swell ratio of the liquid absorbing sheet tends to decrease.

On the other hand, the results of Comparative Example 1 indicate that the polyfunctional monomer-free liquid absorbing resin layer dissolves in the nonaqueous solvent and thus cannot be used as the element for absorbing the electrolyte solution. The results of Comparative Example 2 indicate that when the monofunctional monomer has too large a SP value so that its homopolymer is substantially insoluble in the nonaqueous solvent, the swell ratio of the liquid absorbing sheet becomes too small, making the liquid absorbing sheet unsuitable for use as the element for absorbing the electrolyte solution. The results of Comparative Example 3 indicate that when the monofunctional monomer has too small a SP value so that its homopolymer is again substantially insoluble in the nonaqueous solvent, the swell ratio of the liquid absorbing sheet becomes too small, making the liquid absorbing sheet unsuitable for use as the element for absorbing the electrolyte solution.

Example 7

Figure 4:
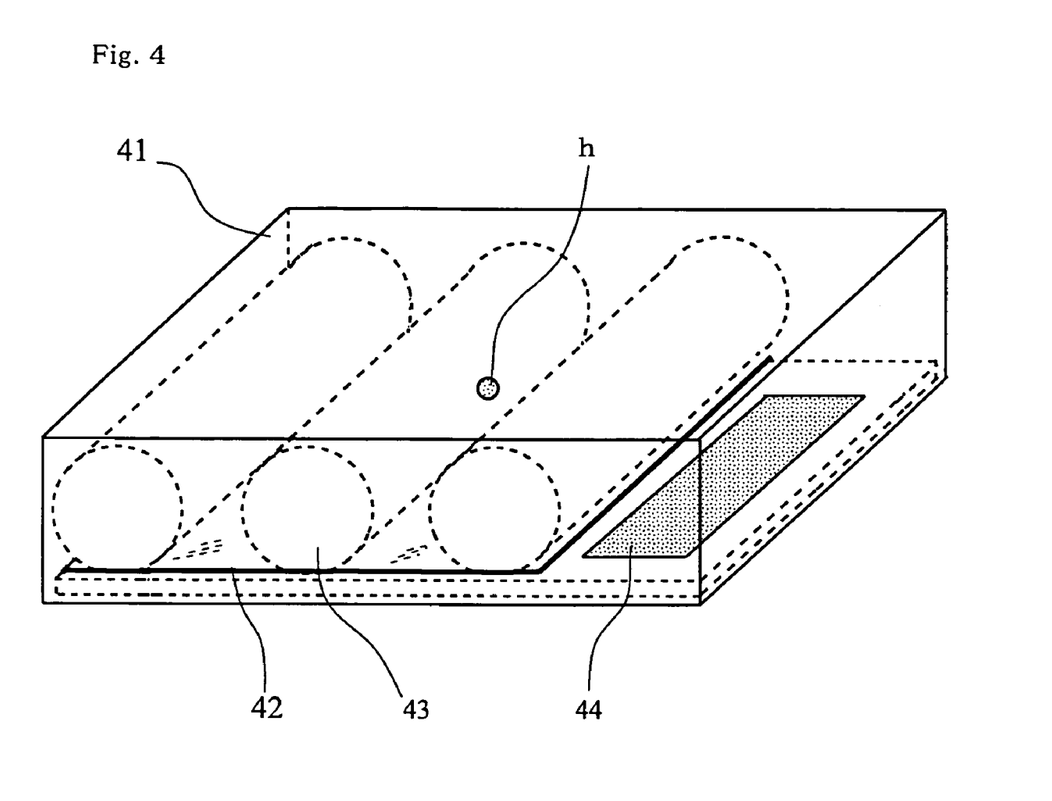
FIG. 4 is a diagram illustrating an electrolyte absorption test conducted using a model battery pack.

Test for the Ability to Absorb an Electrolyte Solution Using a Simulated Battery Pack As shown in FIG. 4, a 7.0 cm (1)×7.9 cm (w)×2.3 cm (h) ABS resin box 41 was obtained. A 6.5 cm (1)×6.5 cm (w) 100 μm-thick liquid absorbing sheet 42 prepared according to Example 1 was stuck to the bottom of the box with a commercially available adhesive. Three lithium ion batteries 43 were placed on the liquid absorbing sheet 42, and a glass epoxy substrate 44 as a circuit board was placed adjacent to the batteries.

A hole h was drilled through the side wall of one of the batteries 43 that was in the middle of the three. The electrolyte solution leaking from the hole was allowed to be absorbed by the liquid absorbing sheet. After drilling of the hole h, the batteries were left for one day and night and the inside of the battery pack was observed. It turned out that the glass epoxy substrate was not wet. In addition, the decrease in weight of the battery with the hole h drilled in it was 2.5 g, which was equal to the increase in weight of the liquid absorbing sheet. These observations suggest that the leaked electrolyte solution was entirely absorbed by the liquid absorbing sheet.

Examples 8 Through 15

One of the different monofunctional monomers shown in Table 4, polyethylene glycol diacrylate to serve as a polyfunctional monomer (ethylene glycol-added mol number=14, 14EG-A, Kyoeisha Chemical) and 2-hydroxy-2-methyl-1-phenylpropane-1-one to serve as a polymerization initiator were mixed together in the proportions shown in Table 4. Using a roll coater, the mixture was applied to a polyethylene terephthalate film and was irradiated with a UV-ray with a wavelength of 365 nm. The UV-ray was shone at an energy density of 2000 mJ/cm² to cause the composition to polymerize and thereby form a polymer film. The polymer film was then peeled off from the polyethylene terephthalate film to give a single-layered liquid absorbing sheet (210 g/m²).

Meanwhile, an electrolyte solution was prepared by adding lithium phosphate hexafluoride to serve as an electrolyte to a mixed solvent containing equal volumes of dimethylcarbonate, propylene carbonate, and ethylene carbonate ($SP_{(solvent)mix}$=20.2). 0.2 ml of this electrolyte solution was added dropwise onto 0.03 g of the liquid absorbing sheet and the time it took for the solution to be completely absorbed by the liquid absorbing sheet was visually measured. The liquid absorbing sheet was also immersed in a large volume of the electrolyte solution at 23° C. After 3 hours, the appearance of the liquid absorbing resin layer was visually examined. The liquid absorbing sheet was pulled out of the mixed solvent and the solvent remaining on the surface was immediately wiped off. The sheet was weighed and its swell ratio was determined. Furthermore, the liquid absorbing sheet was heated in a wet heat oven (40° C., 90% RH, 96 hrs) and was examined for the degree of swelling. The results are shown in Table 5.

In addition, a 5 cm wide strip of a polypropylene nonwoven fabric (Unitika) was laminated onto either side of the liquid absorbing sheet using the hand roller technique (23° C.) or the thermal lamination technique (80° C.). The adhesion strength was then determined on a tensile tester (TENSILON, Orientech) used in T-peel mode. Also, a 3 cm wide strip of the liquid absorbing sheet was laminated onto an Ni surface using the hand roller technique (23° C.) or the thermal lamination technique (80° C.). The adhesion strength was then determined on a tensile tester (TENSILON, Orientech) used in T-peel mode. The results are shown in Table 5.

Each liquid absorbing sheet was also examined for the SP value of the monofunctional monomer ($SP_{(monomer)}$), the difference in the SP value between the monofunctional monomer and the solvent ($\Delta SP$ value), the density of crosslinks in the liquid absorbing resin layer of the liquid absorbing sheet and the state after the immersion period. The results are also shown in Table 5.

TABLE 4

| Components | Examples (wt parts) | | | | | | | |
|---|---|---|---|---|---|---|---|---|
| | 8 | 9 | 10 | 11 | 12 | 13 | 14 | 15 |
| Tetrahydrofurfuryl acrylate | 100 | — | — | — | — | — | — | — |
| Benzyl acrylate | — | 100 | — | — | — | — | — | — |
| Phenoxyethyl acrylate | — | — | 100 | — | — | — | — | — |
| Phenoxypolyethylene glycol acrylate (n = 6) | — | — | — | 100 | — | — | — | — |
| Methoxypolyethylene glycol acrylate (n = 3) | — | — | — | — | 100 | — | — | — |
| Methoxypolyethylene glycol acrylate (n = 9) | — | — | — | — | — | 100 | — | — |
| Acryloyl morpholine | — | — | — | — | — | — | 100 | — |
| N,N-diethylacrylamide | — | — | — | — | — | — | — | 100 |
| Polyfunctional monomer | 0.5 | 0.5 | 0.5 | 0.5 | 0.5 | 0.5 | 0.5 | 0.5 |
| Photopolymerization initiator | 0.5 | 0.5 | 0.5 | 0.5 | 0.5 | 0.5 | 0.5 | 0.5 |

TABLE 5

| Components | Examples | | | | | | | |
|---|---|---|---|---|---|---|---|---|
| | 8 | 9 | 10 | 11 | 12 | 13 | 14 | 15 |
| (Degree of swelling) W/O wet heat process | | | | | | | | |
| Dropwise addition (min) | 30 | 100 | 120 | 40 | 15 | 15 | 120< | 180 |
| Immersed (times) | 9.0 | 9.4 | 9.6 | 8.2 | 8.6 | 9.0 | 2.3 | 18 |
| (Degree of swelling) With wet heat process | | | | | | | | |
| Dropwise addition (min) | 30 | 130 | 160 | 60 | 20 | 25 | 120< | 200 |
| Immersed (times) | 9.0 | 9.2 | 9.0 | 8.1 | 8.5 | 8.5 | 2.0 | 17 |
| Adhesion strength to nonwoven fabric | | | | | | | | |
| Hand roller (kg/5 cm) | 0.4 | 0.03 | 0.03 | 0.1 | 0.03 | 0 | 0 | 0 |
| Thermal lamination (kg/5 cm) | 0.7 | 0.03 | 0.03 | 0.1 | 0.03 | 0 | 0 | 0.3 |
| Adhesion strength to Ni surface | | | | | | | | |
| Hand roller (kg/3 cm) | 0.3 | 0.02 | 0.02 | 0.08 | 0.03 | 0 | 0 | 0 |
| $SP_{(monomer)}$ | 23 | 22.9 | 22.6 | 20.7 | 20.1 | 19.6 | 25 | 20.6 |
| $\Delta SP$ | 2.8 | 2.7 | 2.4 | 0.5 | −0.1 | −0.6 | 4.8 | 0.4 |
| Crosslink density | 0.002 | 0.002 | 0.003 | 0.004 | 0.003 | 0.006 | 0.002 | 0.002 |
| State after immersion | Film | Film | Film | Film | Film | Film | Film | Film |

As shown by the results of Table 5, the liquid absorbing sheets of Examples 8 through 13 each swelled approximately 8 to 9 times after the immersion period and still retained the film-like shape after they had swollen by absorbing the nonaqueous solvent. This implies that each of these liquid absorbing sheets, while exhibiting varying absorption rates upon dropwise addition of a predetermined amount of the nonaqueous solvent, can serve as an effective liquid absorbing element for absorbing the electrolyte solution should leakage of the solution occur from the nonaqueous electrolyte battery cells.

Although the liquid absorbing sheet of Example 14 swelled at a less swell ratio than the liquid absorbing sheets of Examples 8 through 13, the sheet exhibited a good performance that would allow the practical use of the liquid absorbing sheet as an element for absorbing the electrolyte solution.

While the liquid absorbing sheet of Example 15 showed a slower absorption rate than the liquid absorbing sheets of Examples 8 through 13, it had a good swell ratio.

The liquid absorbing sheets of Examples 8 through 12 each had an liquid absorbing resin layer that itself showed adhesion, so that they did not require a separate adhesion layer. In particular, the liquid absorbing resin layer of the liquid absorbing sheet of Example 8 showed superior adhesion.

Example 16 (Experiments a Through e),
Comparative Example 4 (Experiments f Through h),
and Comparative Example 5

The following components were mixed together in the proportions shown in Tables 1 and 2: one of the different monofunctional monomers shown in Tables 6 and 7, urethane acrylate (AH600, Kyoeisha) to serve as a polyfunctional monomer, 2-hydroxy-2-methyl-1-phenylpropane-1-one (D1173, Ciba Specialty Chemicals) to serve as a polymerization initiator and a phosphate-based liquid flame retardant or an ammonium polyphosphate-based solid flame retardant. Using a roll coater, the mixture was applied to a polyethylene terephthalate film and was irradiated with a UV-ray with a wavelength of 365 nm. The UV-ray was shone at an energy density of 2000 mJ/cm$^2$ to cause the composition to polymerize and thereby form a polymer film. A flame-retardant nonwoven fabric (Japan Vilene) was then laminated over the polymer film and the polyethylene terephthalate film was removed to obtain a double-layered liquid absorbing sheet.

Each of the liquid absorbing sheets so obtained was tested for the flame retardancy, adhesion, swell ratio upon absorption of the electrolyte solution and insulating performance. The tests were conducted in the following manner.

<Flame Retardancy>

The flame retardancy of each liquid absorbing sheet was evaluated according to the UL-94 standard. The results are shown in Tables 6 and 7. The flame retardancy of grade V-0, V-1, or V-2 indicates that the absorbance sheet has sufficient flame retardancy for practical use.

<Adhesion>

A 5 cm wide strip of a polypropylene nonwoven fabric (Japan Vilene) was laminated onto the liquid absorbing sheet over the liquid absorbing resin layer using the hand roller technique (23° C.). The adhesion strength was then determined on a tensile tester (TENSILON, Orientech) used in T-peel mode. The results are shown in Tables 6 and 7.

<Swell Ratio>

An electrolyte solution was prepared by adding lithium phosphate hexafluoride to serve as an electrolyte to a mixed solvent containing equal volumes of dimethylcarbonate, propylene carbonate and ethylene carbonate. The lithium phosphate hexafluoride was added to a concentration of 1 mol/l. The liquid absorbing sheet was immersed in the electrolyte solution at 23° C. After 3 hours, the liquid absorbing sheet was pulled out of the solution and the solution remaining on the surface was immediately wiped off. The sheet was weighed and its swell ratio was determined. The results are shown in Tables 6 and 7.

<Insulating Performance>

The insulation resistance (Ω) of the liquid absorbing resin layer of each liquid absorbing sheet was determined before and after the wet heat process. The results are shown in Tables 6 and 7.

TABLE 6

| | Example 16 (Wt parts) | | | | |
|---|---|---|---|---|---|
| Components | Experiment a | Experiment b | Experiment c | Exeperiment d | Experiment e |
| Benzyl acrylate | 70 | 70 | 70 | 70 | 70 |
| Acryloyl morpholine | 30 | 30 | 30 | 30 | 30 |
| Polyfunctional monomer | 0.5 | 0.5 | 0.5 | 0.5 | 0.5 |
| Photopolymerization initiator | 0.5 | 0.5 | 0.5 | 0.5 | 0.5 |
| Bisphenol A bis(diphenyl)phosphate | 70 | 100 | 150 | 200 | — |
| Hydroquinol bis(diphenyl)phosphate | — | — | — | — | 100 |
| Flame retardancy(UL-94) | V-0 | V-0 | V-0 | V-2 | V-2 |
| Adhesion (kgf/5 cm) | 0.4 | 0.6 | 0.5 | 0.5 | 0.7 |
| Swell Ratio (Times) | 9 | 8 | 6 | 6 | 7 |
| Insulating performance (Ω) (before wet heat process) | $4 \times 10^{12}$ | $4 \times 10^{12}$ | $3 \times 10^{12}$ | $3 \times 10^{12}$ | $1 \times 10^{10}$ |
| Insulating performance (Ω) (after wet heat process) | $1 \times 10^{12}$ | $1 \times 10^{12}$ | $1 \times 10^{12}$ | $1 \times 10^{12}$ | $1 \times 10^{9}$ |

TABLE 7

| Components | Comparative Example 4 (wt parts) | | | Comparative Example 5 (wt parts) |
| --- | --- | --- | --- | --- |
| | Experiment f | Experiment g | Experiment h | |
| Benzyl acrylate | 70 | 70 | 70 | 70 |
| Acryloyl morpholine | 30 | 30 | 30 | 30 |
| Polyfunctional monomer | 0.5 | 0.5 | 0.5 | 0.5 |
| Photopolymerization initiator | 0.5 | 0.5 | 0.5 | 0.5 |
| Bisphenol A bis(diphenyl)phosphate | 0 | 50 | 250 | — |
| Ammonium polyphosphate | — | — | — | 200 |
| Flame retardancy (UL-94) | NA | NA | NA | V-0 |
| Adhesion (kgf/5 cm) | NA | NA | 0.3 | NA |
| Swell Ratio (Times) | 9 | 9 | 4 | — |
| Insulating performance ($\Omega$) (before wet heat process) | $9 \times 10^{13}$ | $9 \times 10^{13}$ | $9 \times 10^{13}$ | $3 \times 10^{14}$ |
| Insulating performance ($\Omega$) (after wet heat process) | $2 \times 10^{12}$ | $2 \times 10^{12}$ | $2 \times 10^{12}$ | $3 \times 10^{10}$ |

As shown by the results of Table 6, the liquid absorbing sheets of Experiments a through d of Example 16 each had a good flame retardancy and adhesion, swelled 6 times or more, and exhibited a superior insulating performance. The liquid absorbing sheet of Experiment e had a high flame retardancy, adhesion, and swell ratio comparable to those of the liquid absorbing sheets of Experiments a through d. In fact, the liquid absorbing sheet of Experiment e showed higher adhesion than the other liquid absorbing sheets. While the liquid absorbing sheet of Experiment e had relatively low insulating performance, the fluctuation of the insulating performance was small over the wet heat process, proving high storage stability of the liquid absorbing sheet.

The results of Table 7 for the liquid absorbing sheets of Experiments f through h of Comparative Example 4 indicate that the desired flame retardancy may not be achieved not only when bisphenol A bis(diphenyl)phosphate, a phosphate-based liquid flame retardant, is not added, but also when its amount is too little or too much. The liquid absorbing sheet of Comparative Example 5, which used the ammonium polyphosphate-based solid flame retardant, showed no adhesion, and its insulation performance was significantly decreased after the wet heat process.

Example 17

Test for the Ability to Absorb an Electrolyte Solution Using a Simulated Battery Pack As shown in FIG. 4, a 7.0 cm (1)×7.9 cm (w)×2.3 cm (h) ABS resin box 41 was obtained. A 6.5 cm (1)×6.5 cm (w) 100 μm-thick liquid absorbing sheet 42 prepared according to Example 1 was stuck to the bottom of the box with a commercially available adhesive. Three lithium ion batteries 43 were placed on the liquid absorbing sheet 42, and a glass epoxy substrate 44 as a circuit board was placed adjacent to the batteries.

A hole h was drilled through the side wall of one of the batteries 43 that was in the middle of the three. The electrolyte solution leaking from the hole was allowed to be absorbed by the liquid absorbing sheet. After drilling of the hole h, the batteries were left for one day and night and the inside of the battery pack was observed. It turned out that the glass epoxy substrate 44 was not wet. In addition, the decrease in weight of the battery with the hole h drilled in it was 2.5 g, which was equal to the increase in weight of the liquid absorbing sheet. These observations suggest that the leaked electrolyte solution was entirely absorbed by the liquid absorbing sheet.

INDUSTRIAL APPLICABILITY

As set forth, the liquid absorbing sheet of the present invention includes a liquid absorbing resin layer that can effectively absorb the nonaqueous electrolyte solution used in nonaqueous electrolyte secondary batteries. This makes the liquid absorbing sheet an effective liquid-absorbing element suitable for use in nonaqueous electrolyte battery packs (in particular, in lithium ion-based nonaqueous electrolyte secondary battery packs).

A phosphate-based liquid flame retardant may be added to the liquid absorbing resin layer of the liquid absorbing sheet of the present invention. When added, the agent imparts superior flame retardancy to the liquid absorbing sheet. As a result, not only does the liquid absorbing sheet exhibit the high ability to absorb the nonaqueous electrolyte solution, which is required in nonaqueous electrolyte secondary batteries to make nonaqueous electrolyte battery packs (in particular, in lithium ion-based nonaqueous electrolyte secondary battery packs), but it also shows adhesion and superb flame retardancy. Accordingly, the liquid absorbing sheet of the present invention is suitable as a liquid-absorbing element for absorbing the electrolyte solution in nonaqueous electrolyte battery packs.

The invention claimed is:

1. A liquid absorbing sheet comprising a liquid absorbing resin layer, wherein the liquid absorbing resin layer is obtained by irradiating UV-rays onto a monomer composition to polymerize the monomer composition, the monomer composition containing:
   a monofunctional monomer component containing a monofunctional monomer capable of forming a homopolymer that is soluble in a nonaqueous solvent used in a nonaqueous electrolyte secondary battery; and
   a polyfunctional monomer component;
   wherein:
   the nonaqueous solvent contains at least one of dimethyl carbonate, propylene carbonate and ethylene carbonate;
   the monofunctional monomer is benzyl acrylate, N-vinyl-2-pyrrolidone, imide acrylate, acryloyl morpholine, phenoxyethyl acrylate, N,N-diethylacrylamide, methoxypolyethylene glycol acrylate, tetrahydrofurfuryl acrylate, or phenoxypolyethylene glycol acrylate;
   the liquid absorbing resin layer has a crosslink density of 0.0001 to 0.17;
   the monofunctional monomer is contained at 20 mol % in the monofunctional monomer component; and
   the polyfunctional monomer component is selected from the group consisting of hydroxyl pivalic acid neopentyl glycol diacrylate, polyethylene glycol diacrylate (ethylene oxide-added mol number (n) =14), bisphenol A diacrylate, phenyl glycidyl ether acrylate, and hexamethylene diisocyanate urethane prepolymer.

2. A liquid absorbing sheet comprising a liquid absorbing resin layer, wherein the liquid absorbing resin layer is obtained by irradiating UV-rays onto a monomer composition to polymerize the monomer composition, the monomer composition containing:
   a monofunctional monomer component containing a monofunctional monomer capable of forming a homopolymer that is soluble in a nonaqueous solvent used in a nonaqueous electrolyte secondary battery; and a polyfunctional monomer component;

wherein a phosphate-based liquid flame retardant is bisphenol A bis(diphenyl)phosphate, hydroquinol bis(diphenyl)phosphate, phenyl dixylenyl phosphate, tricresyl phosphate, cresyl diphenyl phosphate, trixylenyl phosphate, xylenyl diphenyl phosphate, resorcinol bis(diphenyl)phosphate, or 2-ethylhexyl diphenyl phosphate and the phosphate-based liquid flame retardant is present in the monomer composition in an amount of 70 to 200 parts by weight with respect to 100 parts by weight of the monofunctional monomer component and the polyfunctional monomer component combined.

3. The liquid absorbing layer according to claim 1, further comprising a phosphate-based liquid flame retardant that is bisphenol A bis(diphenyl)phosphate, hydroquinol bis(diphenyl)phosphate, phenyl dixylenyl phosphate, tricresyl phosphate, cresyl diphenyl phosphate, trixylenyl phosphate, xylenyl diphenyl phosphate, resorcinol bis(diphenyl)phosphate, or 2-ethylhexyl diphenyl phosphate and the phosphate-based liquid flame retardant is present in the monomer composition in an amount of 70 to 200 parts by weight with respect to 100 parts by weight of the monofunctional monomer component and the polyfunctional monomer component combined.

4. The liquid absorbing sheet according to claim 2, wherein the difference between a solubility parameter value of the monofunctional monomer and a solubility parameter value of the nonaqueous solvent is in the range of -1.0 to 8.0.

5. The liquid absorbing sheet according to claim 4, wherein the nonaqueous solvent has a solubility parameter value of 17 to 28.

6. The liquid absorbing sheet according to claim 2, wherein the nonaqueous solvent contains at least one of dimethyl carbonate, propylene carbonate, and ethylene carbonate, and the homopolymer is obtained by adding 0.1 to 5 parts by weight of a UV-polymerization initiator per 100 parts by weight of the monofunctional monomer and irradiating UV-rays onto the mixture.

7. The liquid absorbing sheet according to claim 6, wherein the homopolymer dissolves in the nonaqueous solvent when 1 part by weight of the homopolymer is immersed in 30 parts by weight of the mixed solvent at room temperature for 24 hours.

8. The liquid absorbing sheet according to claim 2, wherein the monofunctional monomer is benzyl acrylate, N-vinyl-2-pyrrolidone, imide acrylate, acryloyl morpholine, phenoxyethyl acrylate, N,N-diethylacrylamide, methoxypolyethylene glycol acrylate, tetrahydrofurfuryl acrylate, or phenoxypolyethylene glycol acrylate.

9. The liquid absorbing sheet according to claim 2, wherein the liquid absorbing resin layer has a crosslink density of 0.0001 to 0.17.

10. The liquid absorbing sheet according to claim 2, wherein the liquid absorbing resin layer is formed on a substrate.

11. The liquid absorbing sheet according to claim 10, wherein the substrate is capable of absorbing and retaining the nonaqueous electrolyte solution.

12. The liquid absorbing sheet according to claim 2, wherein the monomer composition further contains a phosphate-based liquid flame retardant.

13. The liquid absorbing sheet according to claim 12, wherein the phosphate-based liquid flame retardant is bisphenol A bis(diphenyl)phosphate, hydroquinol bis(diphenyl)phosphate, phenyl dixylenyl phosphate, tricresyl phosphate, cresyl diphenyl phosphate, trixylenyl phosphate, xylenyl diphenyl phosphate, resorcinol bis(diphenyl)phosphate, or 2-ethylhexyl diphenyl phosphate.

14. The liquid absorbing sheet according to claim 12, wherein the phosphate-based liquid flame retardant is present in the monomer composition in an amount of 70 to 200 parts by weight with respect to 100 parts by weight of the monofunctional monomer component and the polyfunctional monomer component combined.

15. A nonaqueous electrolyte battery pack comprising a nonaqueous electrolyte battery cell, a circuit board, an electrolyte-absorbing element for absorbing an electrolyte solution in the event of electrolyte leakage from the nonaqueous electrolyte battery cell, and a battery case encasing the battery cell, the circuit board and the electrolyte-absorbing element, characterized in that the electrolyte-absorbing element is formed of the liquid absorbing sheet according to claim 1.

16. A nonaqueous electrolyte battery pack comprising a nonaqueous electrolyte battery cell, a circuit board, an electrolyte-absorbing element for absorbing an electrolyte solution in the event of electrolyte leakage from the nonaqueous electrolyte battery cell, and a battery case encasing the battery cell, the circuit board and the electrolyte-absorbing element, characterized in that the electrolyte-absorbing element is formed of the liquid absorbing sheet according to claim 2.

17. The liquid absorbing sheet according to claim 1, wherein the difference between a solubility parameter value of the monofunctional monomer and a solubility parameter value of the nonaqueous solvent is in the range of -1.0 to 8.0.

18. The liquid absorbing sheet according to claim 17, wherein the nonaqueous solvent has a solubility parameter value of 17 to 28.

19. The liquid absorbing sheet according to claim 1, wherein the homopolymer dissolves in the nonaqueous solvent when 1 part by weight of the homopolymer is immersed in 30 parts by weight of the mixed solvent at room temperature for 24 hours.

20. The liquid absorbing sheet according to claim 1, wherein the liquid absorbing resin layer is formed on a substrate.

21. The liquid absorbing sheet according to claim 20, wherein the substrate is capable of absorbing and retaining the nonaqueous electrolyte solution.

22. The liquid absorbing sheet according to claim 1, wherein the monomer composition further contains a phosphate-based liquid flame retardant.

* * * * *